(12) United States Patent
Wyland et al.

(10) Patent No.: US 9,475,101 B2
(45) Date of Patent: Oct. 25, 2016

(54) SIGHT GLASS CLEANING APPARATUS

(71) Applicants: William D. Wyland, Driftwood, TX (US); Justin W. Foreman, Lake Charles, LA (US)

(72) Inventors: William D. Wyland, Driftwood, TX (US); Justin W. Foreman, Lake Charles, LA (US)

( * ) Notice: Subject to any disclaimer, the term of this patent is extended or adjusted under 35 U.S.C. 154(b) by 410 days.

(21) Appl. No.: 14/064,595

(22) Filed: Oct. 28, 2013

(65) Prior Publication Data
US 2015/0007408 A1    Jan. 8, 2015

Related U.S. Application Data

(60) Provisional application No. 61/843,086, filed on Jul. 5, 2013.

(51) Int. Cl.
| | | |
|---|---|---|
| *B08B 9/035* | (2006.01) | |
| *B08B 9/00* | (2006.01) | |
| *B08B 9/032* | (2006.01) | |
| *G01F 23/02* | (2006.01) | |
| *B60P 3/22* | (2006.01) | |

(52) U.S. Cl.
CPC ............... *B08B 9/035* (2013.01); *B08B 9/00* (2013.01); *B08B 9/032* (2013.01); *B60P 3/228* (2013.01); *G01F 23/02* (2013.01)

(58) Field of Classification Search
CPC ........... B08B 9/00; G01F 23/02; B60P 3/228
See application file for complete search history.

(56) References Cited

U.S. PATENT DOCUMENTS

| | | | |
|---|---|---|---|
| 1,276,831 A * | 8/1918 | Tillery | G01F 23/02 73/324 |
| 2,648,857 A | 8/1953 | Kelly et al. | |
| 2,765,660 A * | 10/1956 | De Hart | G01F 23/02 15/104.16 |
| 3,393,564 A * | 7/1968 | Simmons | F04D 13/16 122/379 |
| 3,398,023 A | 8/1968 | Jacobsen et al. | |
| 3,467,113 A | 9/1969 | Jacobsen et al. | |
| 3,672,749 A | 6/1972 | Roser | |
| 3,744,873 A | 7/1973 | Jamison | |
| 4,103,552 A * | 8/1978 | Bucchianeri | B08B 3/04 134/113 |
| 4,541,277 A | 9/1985 | Starnes, Jr. | |
| 5,493,907 A | 2/1996 | Misuraca | |
| 7,827,863 B2 | 11/2010 | Kurth | |
| 2010/0038100 A1 | 2/2010 | Schuetzle | |
| 2011/0035920 A1 | 2/2011 | Robbins | |

* cited by examiner

*Primary Examiner* — Dung Van Nguyen

(57) ABSTRACT

An apparatus for cleaning the sight glass tube used in determining level of the contents of a vehicle mounted vacuum tank is disclosed. The apparatus includes a cleaning fluid tank holding a quantity of cleaning fluid mounted to the vacuum tank vehicle, a cleaning fluid vacuum line running between the sight glass tube and the cleaning fluid tank, and a control valve for opening and closing the cleaning fluid vacuum line whereby opening the cleaning fluid line will draw a quantity of cleaning fluid from the cleaning fluid tank through the cleaning fluid vacuum line and through the sight glass tube and thereby cleaning the sight glass tube.

18 Claims, 2 Drawing Sheets

SIGHT GLASS CLEANING APPARATUS

PRIORITY

This application claims priority to U.S. provisional application Ser. No. 61/843,086 filed Jul. 5, 2013 entitled "Sight Glass Cleaning Apparatus", the entire content of which is hereby incorporated by reference.

FIELD OF INVENTION

This invention relates generally to devices for cleaning the interior of existing sight-glass devices as in use on the sides of tanks and other vessels. More particularly, the invention relates to an apparatus for cleaning the interior of it sight glass on a vacuum tank.

BACKGROUND OF THE INVENTION

Vacuum tanks having an interior pressure below atmospheric pressure are used to suction or draw material such as fluids, fluid slurries or sludges into the vacuum tank for storage. These vacuum tanks may be used as standalone tanks but such vacuum tanks may also be mounted on the cargo bed of a truck or trailer. Clear or transparent sight glass tubes made of a heavy safety glass or a polymer hose material are often mounted on the vacuum tanks so a user may readily determine by visual inspection the level of contents fluids being retained in the tank. One problem associated with such sight glass tubes is that the interior surfaces of the tubes often become coated with dirt, oil, or other contaminating coatings so a visual determination of the fluid level in the tank becomes difficult if not impossible. In order for the glass tube to be cleaned, it must typically be removed from the tank and then scrubbed or water hosed to remove the interior surface coatings so the sight glass is suitable for use. Then the sight glass tube must be reattached to the tank. Depending upon the placement of the flanges and valves used for mounting the sight glass tube to the tank, such removal, cleaning and reattachment is often inconvenient and time consuming.

A need exists for an apparatus to allow the sight glass tube to be readily cleaned without having to remove the sight glass tube from the vacuum tank.

SUMMARY OF THE INVENTION

An apparatus for cleaning the sight glass tube level indication of as vacuum tank mounted on a truck or trailer is disclosed. The apparatus is comprised of a cleaning fluid tank holding a quantity of cleaning fluid such as water, to cleaning fluid vacuum line running between the sight glass tube and the cleaning fluid tank, and a control valve for opening and closing the cleaning fluid vacuum line. The cleaning fluid tank, control valve, and the vacuum line are configured whereby opening and closing the valve will draw cleaning fluid from the cleaning fluid tank through the sight glass tube by means of the vacuum provided in the vacuum tank to clean the sight glass tube. The apparatus may be fitted with ancillary valves and lines to pull cleaning fluid (water) from the cleaning fluid tank to an eyewash station or to provide water for a hand wash station.

It is thought that the cleaning fluid tank will be attached to the truck or trailer on which the vacuum tank is mounted so cleaning fluid may be provided as needed as the truck or trailer is moved to various locations. The cleaning fluid tank may also be provided as a separate, unattached, cleaning fluid tank. Such a cleaning fluid tank may be maintained at a depot area or other station point where the vacuum truck or trailer is maintained or deployed and where a wash system is not otherwise available and attached as needed via a vacuum line to provide cleaning fluid for the sight glass tubes. The cleaning fluid tank, vacuum line, and valve system will allow the clarity of the sign glass tube to be maintained as the truck or trailer is being used, or before or after it is deployed for use, without the necessity of removal or disassembly of the sight glass tube from the associated vacuum tank.

DESCRIPTION OF THE EMBODIMENT

Figure 1:
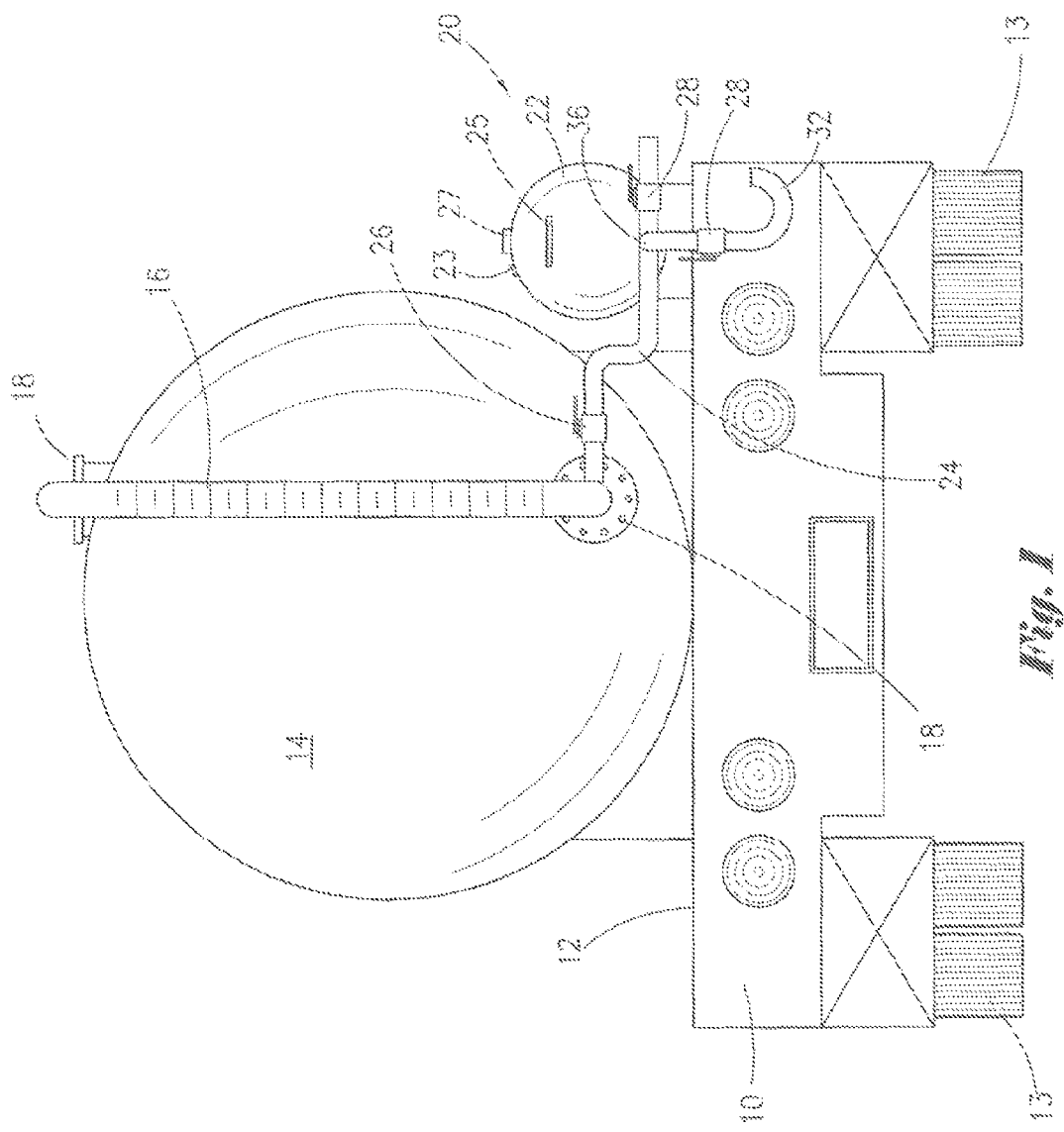
FIG. 1 is a rear view of the sight glass tube cleaning apparatus as in use on a vacuum vessel of a vacuum truck.

Referring to FIG. 1 or the drawings, there is shown a vacuum truck or trailer (10) having a cargo bed (12) and wheels (13) upon which is mounted a vacuum tank (14). The vacuum tank (14) is provided with a vertically oriented level indicator sight glass tube (16). The sight glass tube (16) is attached by flanges (18) to the vacuum tank (14) so that sight glass tube (16) is in communication with the interior of a vacuum tank (14). The sight glass tube (16) provides a means for visual determination of the level of the contents within the vacuum tank (14).

The sight glass cleaning apparatus (20) which is the subject of this application is also mounted on truck cargo bed (12) or to some other suitable location on the vacuum truck or trailer (10) such as on as wheel fender. The sight glass cleaning apparatus (20) is comprised of a pressurized cleaning fluid vessel or tank (22) that contains as quantity of washing or cleaning fluid, a vacuum line (24), a control valve (26). The cleaning fluid tank (22) is attached to the cargo bed (12) of the vacuum truck (10) by bolting, welding, or other attachment means. The control valve (26) may be any suitable manual valve such as a butterfly valve or a ball valve, however a power actuated valve may also be utilized. The cleaning fluid in the cleaning fluid tank (22) may be water alone, water containing a surfactant, a liquid solvent cleaner, or any other suitable wash fluid depending upon the type of material being collected in the vacuum tank (14).

Cleaning fluid tank (22) has a filling port that is opened and closed by means of a filling cap (27) to allow for the introduction of cleaning fluid. It is thought that the filling cap (27) will be threadably connected to and removable from the cleaning fluid tank (22) to open the filling port to allow introduction of cleaning fluid into the tank. Removing the filling cap (27) from the cleaning fluid tank (22) provides a vent or opening from the cleaning fluid tank (22) to the atmosphere to equalize fluid pressure. Other means of removably attaching filing cap (27) to the fluid cleaning tank (22) to open and close the filling port may be utilized such as a clamps affixed between the filing cap (27) and the fluid cleaning tank (22). The filling cap (27) may also be fined with a valved pressure release vent that may be selectively opened and closed. Such a valved vent will allow the cleaning fluid tank to be vented to the atmosphere without having to remove the filling cap (27) from the fluid cleaning tank (22).

The vacuum line (24) is attached to the sight glass tube (16), preferably at its lower end, and to the cleaning fluid tank (22). The control valve (26) is interposed in the vacuum line (24) to provide a means for controlled fluid communication between the sight glass tube (16) and the cleaning thud tank (22). When the control valve (26) is open, and with filling cap (27) removed or an associated valved vent opened, the wash fluid is drawn from the cleaning fluid tank (22), by means of the vacuum maintained in the vacuum tank (14), into and through the sight glass tube (16) into the vacuum tank (14). The wash fluid from the cleaning fluid tank (22) provides a continuous stream of cleaning fluid through the sight glass tube (16) to clean the interior of the sight glass tube (16) so that a clear view through the sight glass tube (16) may be maintained.

In most situations the sight glass cleaning apparatus (20) will be mounted on the vacuum truck (10) to provide a portable truck mounted means for cleaning the sight glass tube when thought necessary. However, the apparatus (20) may be attached, permanently or temporarily, to the sight glass tube of a stationary vacuum tank (14) by valves and fittings as needed for cleaning the sight glass tube.

If the vacuum truck (10) has more than one vacuum tank (14) mounted on the cargo bed (12), each vacuum tank (14) having a sight glass tube (16), the apparatus (20) may be provided with additional vacuum lines (30) and flow diverter valves (28), as necessary, to direct flow from the cleaning fluid tank (22) to a desired sight glass tube from on a the multiple vacuum tanks (14). Similarly, if a vacuum tank (14) has more than one sight glass tube, then additional flow diverter valves (28), vacuum lines (30), or cleaning fluid tanks (22) as necessary may be provided to direct cleaning fluid flow to the desired sight glass tube (16).

Figure 2:
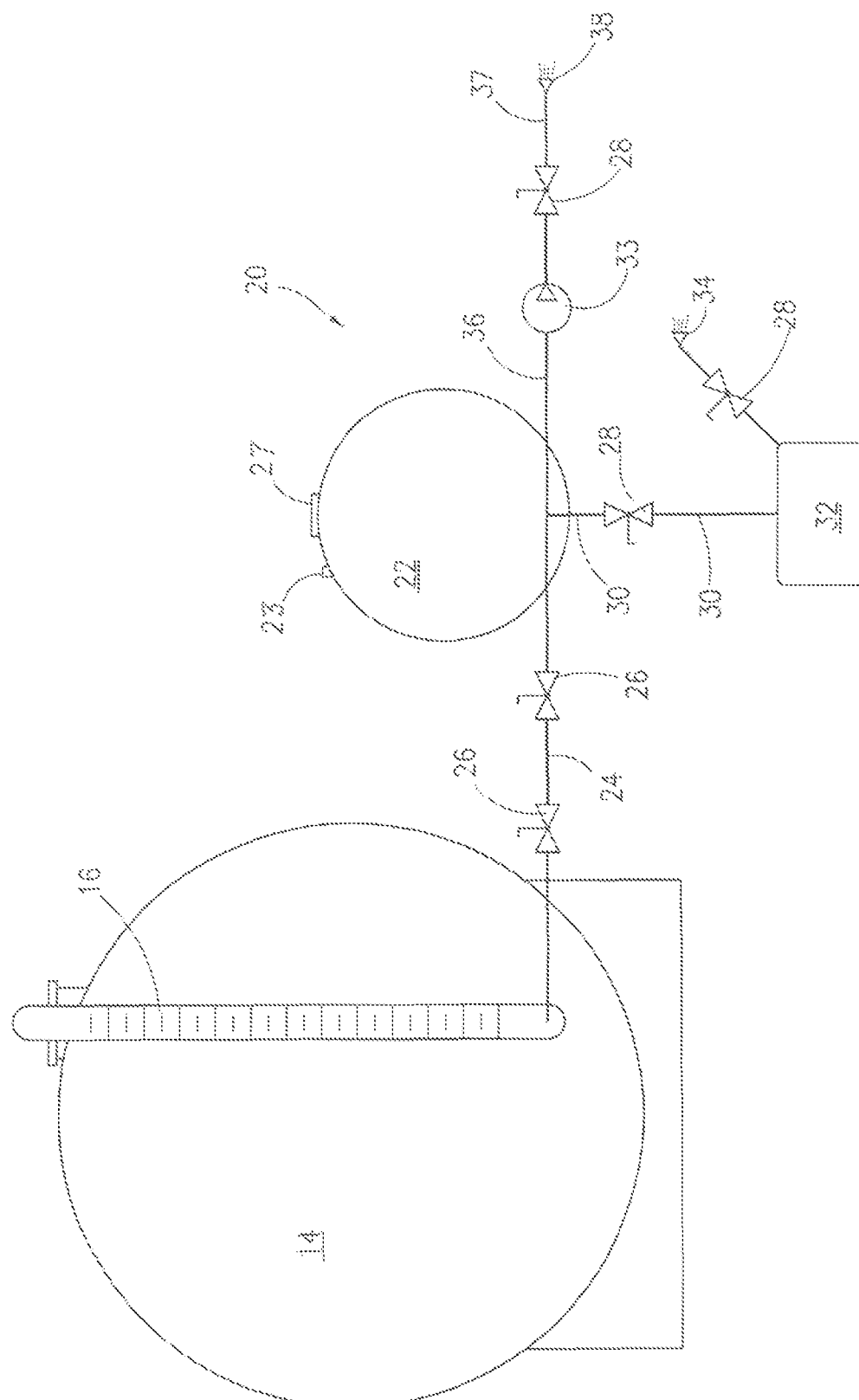
FIG. 2 is a schematic view of an embodiment of the sight glass tube cleaning apparatus.

FIG. 2 of the drawings shows a schematic view of the sight glass cleaning apparatus (20) positioned with respect to the sight glass tube of a vacuum tank (14). As shown in the schematic depicted in FIG. 2, the sight glass tube (16) is in communication with vacuum tank (14) that is holding its contents in vacuum. The sight glass tube (16) of the vacuum tank (14) allows the level of material contained in the vacuum tank (14) to be observed.

The cleaning fluid tank (22) of apparatus (20) contains a quantity of cleaning fluid and is connected to the sight glass tube (16), preferably at its lower end, by means of a vacuum line (24) and by at least one control valve (26). When the control valves (26) are open and the cleaning fluid tank vented as described above, a stream of cleaning fluid from the cleaning fluid tank (22) will be drawn through the vacuum line (24) and through the interior of sight glass tube (16) by means of the vacuum being held in the vacuum tank (14). This stream of cleaning fluid will clean the sight glass tube (16) so that visibility through the tube may be maintained. When the sight glass tube (16) is sufficiently clean, control valves (26) may be closed to shut off the flow of cleaning fluid from cleaning fluid tank (22) through the sight glass tube (16).

If desired, the cleaning fluid tank (22) of the tank apparatus (20) may be provided with an eyewash station (32) (if water is used as the cleaning fluid) having eye wash faucets (34) in the event of an accident. As shown the eye wash station (32) is connected to the cleaning fluid tank (22) by an ancillary fluid line (30) and an ancillary valve (28). With the control valves (26) closed and ancillary valve (28) open, cleaning fluid flows by gravity from the cleaning fluid tank (22) to the eyewash station (32).

The eyewash station (32) may be mounted on the truck (10) at any conveniently accessible location such as on the truck bed or even a bumper. This will allow a truck operator to have a flow of cleaning water to the eye wash faucets (34) as a ready means for cleaning a worker's eyes in the event the worker is exposed to contaminants due to a spill or accident. In the case of a stationary vacuum tank, the eye wash station (32) may be mounted on a framework an accessible area in the proximity of the vacuum tank (14).

Similarly, the cleaning thud tank (22) of the tank apparatus (20) may be provided with a wash down line (36) with suitable ancillary valves (28) as well as a hose (37), and nozzle (38) in order to provide washing station on the truck (10) or at or near a stationary vacuum tank. The wash down line (36) would afford workers a flow of cleaning fluid for hand washing, personal cleaning, and for cleaning equipment if necessary. With the control valves (26) closed and ancillary valve (28) open, cleaning fluid will flow by gravity from the cleaning fluid tank (22) to the wash down line (36). A pump (33), shown in conjunction with the wash line down line (36), may be used to enhance the stream of cleaning fluid from the cleaning fluid tank (22). Pump (33) may be powered by any suitable means. It is thought the pump (33) will electric pump such as a 12 volt DC pump powered by the electrical system of the truck (10). The pump (33) may also be powered by a battery or bank of batteries that are separate from the primary electrical system of the truck. A pump such as that shown as (33) may also be provided with line (30) to the eye wash station (32) for enhancing the cleaning fluid flow to the eyewash station (32).

The eye washing station (32) and wash line (36) are intended to be optional additions to the apparatus (20) or provided for emergency purposes only. In some situations it may be inadvisable to use the cleaning fluid from the cleaning fluid tank (22) for personal uses such as eye or hand washing as the cleaning fluid may be unsuitable for such purposes or because the cleaning fluid has become contaminated by the contents of the vacuum tank (14). In those situations the eye washing station (32) and wash line (36) may be removed from the apparatus or disabled.

The cleaning fluid tank (22) of the apparatus (20) is intended to withstand a desired negative pressure. However, a pressure release valve (23) may be provided to vent accumulated pressure in the cleaning fluid tank (22) to prevent its collapse due to the vacuum generated by the vacuum tank (14). Releasing pressure in the cleaning fluid tank (22) will also allow the cleaning fluid tank to be filled with a desired cleaning fluid by gravity flow. A filling port (27) having a removable cap is provided to allow the cleaning fluid tank (22) to be refilled with a desired cleaning fluid as necessary. Water from as municipal potable water supply delivered to the tank (22) by a water hose is an adequate cleaning fluid.

The interior of the cleaning fluid tank (22) is preferably coated to guard against corrosion. The dimensions of the tank (22) will vary as necessary depending upon the quantity of cleaning fluid to be retained and the space available on the vehicle where the tank is to be mounted. The cleaning fluid tank (22) may also be dimensioned to be sufficiently portable so that the tank (22) may be readily moved by one or two workers but still retain a sufficient volume of cleaning fluid.

The apparatus (20) with a cleaning fluid tank (22) so portable may be moved as desired from one vacuum tank location to another vacuum tank location by carry handles (25) and the apparatus (20) may then be temporarily attached to a vacuum tank sight glass tube assembly that is preconfigured with attachment fittings for the vacuum line (24) and valve (26). This will allow one apparatus (20) to service multiple tanks.

Since numerous modifications and changes will readily occur to those skilled in the art, it is not desired to limit the invention to the exact construction and operation shown and described. Accordingly any number of suitable modifications and equivalents may be made or resorted to without falling outside the scope of the invention.

What is claimed is as follows:

1. A sight glass tube cleaning apparatus, comprising:
   (a) a vacuum tank holding its contents under a vacuum, said vacuum tank having a sight glass tube in communication with said vacuum tank;
   (b) a cleaning fluid tank holding a quantity of cleaning fluid;
   (c) a cleaning fluid vacuum line running between said sight glass tube and said cleaning fluid tank, and
   (d) a control valve whereby said cleaning fluid vacuum line is opened and closed and whereby said cleaning fluid is drawn from said cleaning fluid rank through said sight glass tube by means of said vacuum in said vacuum tank when said control valve is opened.

2. The apparatus as recited in claim 1 further comprising a vent for releasing pressure from said cleaning fluid tank.

3. The apparatus as recited in claim 2 wherein said vacuum tank is mounted on a vehicle.

4. The apparatus as recited in claim 3 wherein said cleaning fluid tank is mounted to said vehicle.

5. The apparatus as recited in claim 4 wherein said vehicle includes a trailer having a cargo bed.

6. The apparatus as recited in claim 4 wherein said cleaning fluid is water.

7. The apparatus as recited in claim 6 further comprising:
   (a) an eye wash station, having an eye wash faucet;
   (b) an eye wash fluid line from cleaning fluid tank to said eye wash station; and
   (c) a control valve for said eye wash fluid line.

8. The apparatus as recited in claim 1 wherein said cleaning fluid tank is portable.

9. A sight glass tube cleaning apparatus comprising:
   (a) a vacuum tank mounted on a vehicle, said vacuum tank holding its contents in a vacuum;
   (b) a vertically oriented sight glass tube in communication with said vacuum tank;
   (c) a dealing fluid tank holding a quantity of cleaning fluid, said cleaning fluid tank mounted to said vehicle;
   (d) a cleaning fluid vacuum line running between said sight glass tube and said cleaning fluid tank;
   (e) a control valve for opening and closing said cleaning fluid vacuum line whereby opening said cleaning fluid line will draw a quantity of said cleaning fluid from said cleaning fluid tank through said cleaning fluid vacuum line and through said sight glass tube by means of said vacuum held in said vacuum tank, thereby cleaning said sight glass tube; and
   (f) a vent for releasing pressure from said cleaning fluid tank.

10. The apparatus as recited in claim 9 wherein said vehicle includes a trailer having a cargo bed.

11. The apparatus as recited in claim 9 wherein said cleaning fluid is water.

12. The apparatus as recited in claim 11 further comprising:
    (a) an eye wash station;
    (b) an eye wash fluid line from said cleaning fluid tank to said eye wash station; and
    (c) a valve positioned in said eye wash fluid line.

13. The apparatus as recited in claim 10 further comprising:
    (a) a wash down fluid line in communication with said cleaning fluid tank;
    (b) a valve for said wash down fluid line.

14. A sight glass tube cleaning apparatus, comprising:
    (a) a vacuum tank holding a vacuum; said vacuum tank have a sight glass tube in communication with said vacuum tank;
    (b) a cleaning fluid tank holding a quantity of cleaning fluid in communication with said sight glass tube; and
    (c) a control valve whereby said cleaning fluid is drawn from said cleaning fluid tank through said sight glass tube by means of said vacuum in said vacuum tank.

15. The apparatus as recited in claim 14 further comprising an eye wash station in communication with said cleaning fluid tank.

16. The apparatus as recited in claim 14 further comprising a wash down fluid line in communication with said cleaning fluid tank.

17. The apparatus as recited in claim 14 further comprising:
    (a) a wash down fluid line in communication with said cleaning fluid tank; and
    (b) an eye wash station in communication with said cleaning fluid tank.

18. The apparatus as recited in claim 17 wherein a pump is used to deliver fluid from said clean fluid tank to said wash down line and to said eye wash station.

* * * * *